United States Patent [19]

Swarup et al.

[11] Patent Number: 5,618,586
[45] Date of Patent: Apr. 8, 1997

[54] N-ALKOXYMETHYL (METH)ACRYLAMIDE FUNCTIONAL POLYMERS AND THEIR USE IN SELF-CROSSLINKABLE COATING COMPOSITIONS

[75] Inventors: Shanti Swarup, Gibsonia; Michael A. Mayo, Pittsburgh, both of Pa.

[73] Assignee: PPG Industries, Inc., Pittsburgh, Pa.

[21] Appl. No.: 405,470

[22] Filed: Mar. 16, 1995

Related U.S. Application Data

[60] Division of Ser. No. 314,468, Sep. 28, 1994, abandoned, which is a continuation-in-part of Ser. No. 219,322, Mar. 29, 1994, abandoned.

[51] Int. Cl.$^6$ .............. B05D 1/36; B05D 7/16; B05D 1/38
[52] U.S. Cl. .......... 427/407.1; 427/409; 427/388.4
[58] Field of Search .............. 427/409, 407.1, 427/388.4

[56] References Cited

U.S. PATENT DOCUMENTS

| | | | |
|---|---|---|---|
| 3,845,066 | 10/1974 | Vasta | 260/29.6 WB |
| 4,075,141 | 2/1978 | Porter, Jr. et al. | 260/17.2 |
| 4,098,745 | 7/1978 | Borman | 260/29.3 |
| 4,159,364 | 6/1979 | Craig | 428/334 |
| 4,174,333 | 11/1979 | Hartman et al. | 523/414 |
| 4,174,336 | 11/1979 | Leiner et al. | 260/29.7 UP |
| 4,229,336 | 10/1980 | Sicklesteel et al. | 260/29.6 NR |
| 4,289,674 | 9/1981 | Christenson et al. | 523/100 |
| 4,309,327 | 1/1982 | Ishikura et al. | 524/555 |
| 4,322,328 | 3/1982 | Graetz et al. | 524/458 |
| 4,332,657 | 6/1982 | Makuuchi et al. | 204/159.22 |
| 4,335,829 | 6/1982 | Christenson et al. | 524/767 |
| 4,358,508 | 11/1982 | Tanaka et al. | 427/409 |
| 4,390,658 | 6/1983 | Graetz et al. | 524/512 |
| 4,440,897 | 4/1984 | Maska | 524/535 |
| 4,563,372 | 1/1986 | Kurauchi et al. | 427/409 |
| 4,605,476 | 8/1986 | Hart et al. | 204/181.6 |
| 4,714,634 | 12/1987 | Miyazono et al. | 427/409 |
| 4,720,405 | 1/1988 | Carson et al. | 427/410 |
| 4,759,961 | 7/1988 | Kato et al. | 427/412.3 |
| 4,859,508 | 8/1989 | Pangrazi et al. | 427/392 |
| 4,933,214 | 6/1990 | Sugiura et al. | 427/379 |
| 4,981,729 | 1/1991 | Zaleski | 427/412.3 |
| 5,064,695 | 11/1991 | Hotta et al. | 427/407.1 |
| 5,096,954 | 3/1992 | Yamada et al. | 524/511 |
| 5,290,602 | 1/1994 | Argyropoulos et al. | 427/421 |

OTHER PUBLICATIONS

Aldrich Chemical Catalog (1988–1989), pp. 261 and 1145 (no month).

*Primary Examiner*—Diana Dudash
*Attorney, Agent, or Firm*—Kenneth J. Stachel

[57] ABSTRACT

Self-crosslinkable film-forming compositions and a process for preparing multi-layered coated articles coated with a pigmented or colored base coat and a transparent or clear topcoat containing a self-crosslinkable film-forming composition are disclosed. The self-crosslinkable film-forming composition comprises a non-gelled addition polymer which is the free radical initiated reaction product of an N-alkoxymethyl(meth)acrylamide and at least one other ethylenically unsaturated monomer. The topcoat composition may be aqueous based. The transparent topcoat provides a composite coating with improved acid etch resistance and mar resistance, making the composite coating particularly useful as a topcoat for automotive parts.

12 Claims, No Drawings ed reaction product of the following polymerizable ethylenically unsaturated monomers:

a) about 40 to 80% by weight of an N-alkoxymethyl-(meth)acrylamide; i.e., an N-alkoxymethylacrylamide or N-alkoxymethylmethacrylamide; and b) about 20 to 60% total by weight of at least one polymerizable ethylenically unsaturated monomer selected from the group consisting of styrene, methyl styrene dimer, methyl (meth)acrylate; i.e., methyl acrylate or methyl methacrylate, butyl (meth)acrylate, cyclohexyl (meth)acrylate, and mixtures thereof; the percentage by weight being based on total weight of the polymerizable ethylenically unsaturated monomers used in preparing the polymer. The polymer typically has a weight average molecular weight of about 1800 to 80,000 as determined by gel permeation chromatography using a polystyrene standard. The film-forming composition may be organic solvent or aqueous based.

By "non-gelled" or ungelled is meant that the resin is substantially free from crosslinking, and the resin has a measurable intrinsic viscosity when dissolved in a suitable solvent. In contrast, a gelled resin, having an essentially infinite molecular weight, would have an intrinsic viscosity too high to measure by gel permeation chromatography.

The invention further provides a method for applying a composite coating to a substrate which comprises applying to the substrate a colored film-forming composition to form a base coat and applying to the base coat a clear film-forming composition to form a transparent top coat over the base coat. The main resinous ingredient of the clear film-forming composition is a self-crosslinkable film-forming composition of the type described above.

The reaction products of the invention, because of the relatively high level of N-alkoxymethyl(meth)acrylamide, are difficult to prepare without gelling the reaction mixture. However, if precautions are taken as described herein gelation can be avoided.

Somewhat surprisingly, it has been found that the reaction products of the present invention, when used as the main resinous ingredient of a clear film-forming composition for use over base coats in color-plus-clear composite coatings, provide cured clear coats with excellent resistance to acid etching and to marring.

N-ALKOXYMETHYL (METH)ACRYLAMIDE FUNCTIONAL POLYMERS AND THEIR USE IN SELF-CROSSLINKABLE COATING COMPOSITIONS

CROSS REFERENCE TO RELATED APPLICATIONS

This is a divisional of application Ser. No. 08/314,468, filed Sep. 28, 1994, now abandoned, which is a Continuation-In-Part of U.S. patent application Ser. No. 08/219,322, filed on Mar. 29, 1994 now abandoned.

BACKGROUND OF THE INVENTION

1. Field of the Invention

The present invention relates to self-crosslinkable film-forming compositions, and to the use of such compositions in a process for preparing multi-layered coated articles comprising a pigmented or colored base coat and a transparent or clear topcoat.

2. Brief Description of the Prior Art

Color-plus-clear coating systems involving the application of a colored or pigmented base coat to a substrate followed by the application of a transparent or clear topcoat to the base coat have become conventional as original finishes for automobiles. The clear coat imparts outstanding gloss and distinctness of image (DOI) to the color-plus-clear systems, and serves to protect the base coat from environmental attack.

Because many geographic areas encounter acidic precipitation, resistance to etching by atmospheric acid precipitation ("acid etch resistance") is becoming an increasingly desirable property for coatings, particularly automotive original equipment coatings. Original equipment manufacturers are requiring that coating systems demonstrate acid etch resistance. In response to this requirement, coating compositions based on functional polymers cured with a crosslinking agent have been developed for use in color-plus-clear coating systems.

Coatings cured with aminoplast crosslinking agents such as polymeric polyol-aminoplast systems are known to provide many excellent coating properties. They are inexpensive, durable, and attractive. However, it is widely recognized that such coatings, particularly clear coats, have poor resistance to etching by atmospheric acidic pollutants. Polymeric polyol-aminoplast coating systems of the prior art are not highly effective for providing protection against etching caused by acid rain.

Clear coat compositions comprising polyols such as polyester polyols, polyurethane polyols, and acrylic polyols cured with polyisocyanate crosslinking agents yield coatings with outstanding gloss and distinctness of image. However, such systems do not provide optimum mar and abrasion resistance. In addition, the isocyanates are difficult to handle because they are sensitive to moisture and require cumbersome safety precautions because of their toxicity.

It would be desirable to provide a color-plus-clear coating system which avoids the problems of the prior art by providing improved acid etch resistance and mar resistance properties, and which does not have the drawbacks associated with crosslinking agents of the prior art.

SUMMARY OF THE INVENTION

In accordance with the present invention, a self-crosslinkable film-forming composition is provided comprising a non-gelled addition polymer which is the free radical initi-

DETAILED DESCRIPTION

The polymer mentioned above used in the self-crosslinkable film-forming composition of the present invention may be prepared by reacting an N-alkoxymethyl(meth)acrylamide with at least one other ethylenically unsaturated monomer via free radical initiated addition polymerization techniques.

The N-alkoxymethyl(meth)acrylamide typically has 1 to 6, preferably 1 to 4 carbon atoms in the alkoxy group. Examples include N-ethoxymethyl(meth)acrylamide and N-butoxymethyl(meth)acrylamide. N-butoxymethyl-(meth)acrylamide is preferred. The N-alkoxymethyl (meth)acrylamide is typically present in the polymer at about 40 to 80% by weight, preferably at about 40 to 50% by weight, based on total weight of the polymerizable ethylenically unsaturated monomers used in preparing the polymer. Amounts below about 40% by weight do not provide coatings with sufficient mar resistance, and amounts above about 80% by weight can lead to gelation of the reaction mixture during polymerization and have poor resistance to acid etching.

The other ethylenically unsaturated monomers used in the polymer include vinyl aromatic monomers such as styrene, alphamethyl styrene, and tertiary butyl styrene; vinyl aliphatic monomers such as ethylene, propylene, and 1,3-butadiene; and alkyl esters of acrylic and methacrylic acid having from 1 to 17 carbon atoms in the alkyl group, including methyl (meth)acrylate, ethyl (meth)acrylate, butyl (meth)acrylate, cyclohexyl (meth)acrylate, 2-ethylhexyl (meth)acrylate, isobornyl (meth)acrylate and lauryl (meth)acrylate. The ethylenically unsaturated monomers are typically present in the polymer at about 20 to 60% total by weight, preferably 50 to 60% total by weight, based on total weight of the polymerizable ethylenically unsaturated monomers used in preparing the polymer.

Preferably, the ethylenically unsaturated monomer present in the polymer is selected from the group consisting of styrene, methyl (meth)acrylate, butyl (meth)acrylate, cyclohexyl (meth)acrylate, and mixtures thereof. These monomers are preferred because they provide for better humidity resistance in the cured coating composition.

The polymer may also include up to 15% by weight, based on total weight of the polymerizable ethylenically unsaturated monomers used in preparing the polymer, of an epoxy functional ethylenically unsaturated monomer such as glycidyl (meth)acrylate.

The polymer may further include up to 10% by weight, based on total weight of the polymerizable ethylenically unsaturated monomers used in preparing the polymer, of a hydroxyl functional ethylenically unsaturated monomer selected from the group consisting of hydroxypropyl (meth)acrylate, hydroxyethyl (meth)acrylate, and hydroxybutyl (meth)acrylate. Such monomers are preferred in organic solvent based systems because they result in improved cured film properties by increasing the crosslink density.

The polymer may further include up to 5% by weight, based on total weight of the polymerizable ethylenically unsaturated monomers used in preparing the polymer, of an acid functional ethylenically unsaturated monomer such as acrylic and methacrylic acid in order to improve resistance to marring, but higher levels are not recommended because of a tendency to gel the reaction mixture and to decrease the solids content of the coating composition.

The polymers described above can be prepared by free radical initiated addition polymerization of a mixture of the monomers by organic solution polymerization techniques. The monomers are typically dissolved in an organic solvent or mixture of solvents including ketones such as methyl ethyl ketone, esters such as butyl acetate, the acetate of propylene glycol, and hexyl acetate, alcohols such as ethanol and butanol, ethers such as propylene glycol monopropyl ether and ethyl-3-ethoxypropionate, and aromatic solvents such as xylene and SOLVESSO 100, a mixture of high boiling hydrocarbon solvents available from Exxon Chemical Co. The solvent is first heated to reflux, usually 110° to 160° C., and a mixture of monomers and free radical initiator is slowly added to the refluxing solvent, over a period of about 1 to 5, preferably 1 to 3 hours. Adding the monomers too quickly may cause poor conversion or a high and rapid exotherm, which is a safety hazard. Adding the monomers over a period greater than 5 hours yields a polymer with an undesirably high molecular weight. Suitable free radical initiators include t-amyl peroxyacetate, which is preferred, di-t-amyl peroxyacetate, and 2,2'-Azobis(2-methylbutanenitrile). The free radical initiator is typically present in the reaction mixture at about 2 to 10%, based on total weight of the monomers.

The polymer prepared by the above described technique is non-gelled or ungelled and preferably has a weight average molecular weight of about 2000 to 8500, more preferably 2000 to 6000. Lower molecular weight polymers (less than about 3000 weight average molecular weight) may be prepared by synthesizing the polymer in high boiling solvents at a relatively low solids content (about 30–40 percent by weight, based on total weight of the reaction mixture). After the reaction, the excess solvents are removed from the reaction mixture under reduced pressure to yield a product with a relatively high solids content (at least about 60 weight percent solids). This technique is described in detail in Example M.

The polymers prepared by the techniques described above may be used in organic solvent based film-forming compositions; that is, film-forming compositions containing less than about 5% by weight water, based on total weight of the film-forming composition.

The polymers can also be prepared by free radical initiated polymerization of the mixture of monomers by aqueous emulsion polymerization techniques. Suitable free radical initiators include ammonium persulfate, which is preferred, hydrogen peroxide, and azo-bis(isobutyronitrile), available from E. I. du Pont de Nemours and Co. as VAZO 64. The free radical initiator may be present in the reaction mixture at about 0.1 to 3%, based on total weight of the monomers. Addition of a chain transfer agent such as tertiary dodecyl mercaptan or methyl styrene dimer to control molecular weight is also preferred.

A solution of water, a buffer, and one or more surfactants is prepared first. Suitable buffers include sodium bicarbonate, present in the solution at about 0.05 to 0.2% by weight. Suitable surfactants include anionic and nonionic surfactants and mixtures thereof. Examples of anionic surfactants include sodium lauryl sulfate; sodium dioctyl sulfosuccinate, available from American Cyanamid Co. as AEROSOL OT-75; and ammonium alkylphenoxypolyethoxy sulfosuccinate, available from Rhone-Poulenc Co. as ALIPAL CO-436. Examples of nonionic surfactants include IGEPAL CO-897, an ethoxylated nonyl phenol available from Rhone-Poulenc Co.; and TRITON N-101, a nonyl phenoxypolyethoxy ethanol available from Union Carbide Co. ALIPAL CO-436 is the preferred surfactant. The surfactants are typically present in the water solution at about 0.1 to 0.2% total by weight, based on weight of monomers.

A mixture of the monomers and free radical initiator is then added to a second water solution like that described above, forming a monomer emulsion. During the reaction, the first water solution is heated to about 80° C. and "seeded"; that is, about 3% of the total monomer emulsion is added to the water solution. This is done to control particle size, which is approximately 800 to 1100 Å, preferably about 1000 Å. Larger particle sizes result in poor appearance of the final coating and instability of the coating composition; i.e., separation of phases. After seeding, the rest of the monomer emulsion is added slowly to the water solution over a period of about 1 to 3 hours so as to avoid rapid exotherm and gellation. The reaction is conducted in a temperature range of about 50° to 85° C.

When the polymer is prepared by aqueous emulsion polymerization techniques, N-butoxymethyl(meth)acrylamide is the preferred N-alkoxymethyl (meth)acrylamide used in the polymer. Lower alkoxy groups are very reactive in an aqueous medium and tend to gel the reaction mixture.

The amount of N-butoxymethyl(meth)acrylamide present in the polymer when prepared by aqueous emulsion polymerization techniques is preferably about 40 to 50% by weight, based on total weight of the polymerizable ethylenically unsaturated monomers used in preparing the polymer. More than about 80% by weight tends to gel the reaction mixture.

The polymer, when prepared by aqueous emulsion polymerization techniques, may further include up to 0.2% by weight, based on total weight of the polymerizable ethylenically unsaturated monomers used in preparing the polymer, of an acid functional ethylenically unsaturated monomer such as acrylic and methacrylic acid, but their use is not preferred because of a tendency to gel the reaction mixture.

The polymers prepared by aqueous emulsion polymerization techniques are non-gelled and typically have a weight average molecular weight of about 25,000 to 70,000, preferably about 25,000 to 40,000.

The polymers prepared by the techniques described above may be used in aqueous based film-forming compositions. By aqueous based is meant that the film-forming compositions contain at least about 20% by weight water, based on total weight of the film-forming composition.

Usually the film-forming composition will also preferably contain catalysts to accelerate cure. Examples of suitable catalysts are acidic materials and include phenyl acid phosphate, sulfonic acid, or a substituted sulfonic acid such as paratoluene sulfonic acid and dodecyl benzene sulfonic acid. The catalyst is usually present in an amount of about 0.5 to 1.5 percent by weight, preferably about 0.75 to 1.2 percent by weight, based on total weight of resin solids.

Optional ingredients such as, for example, cosolvents, plasticizers, flow control agents, anti-oxidants, UV light absorbers and similar additives conventional in the art may be included in the composition. Aminoplast crosslinking agents may also be added, particularly when the polymer contains hydroxyl functionality, but their use is not preferred. These ingredients are typically present at up to 25% by weight based on total weight of resin solids.

The film-forming composition of the present invention is preferably used as the clear coat layer in a "color-plus-clear" coating system. The film-forming composition of the base coat in the color-plus-clear system can be any of the compositions useful in coatings applications, particularly automotive applications. The film-forming composition of the base coat comprises a resinous binder and a pigment to act as the colorant. Particularly useful resinous binders are acrylic polymers, polyesters, including alkyds, and polyurethanes.

The base coat compositions may be solventborne or waterborne. Water-based base coats in color-plus-clear compositions are disclosed in U.S. Pat. No. 4,403,003, and the resinous compositions used in preparing these base coats can be used in the practice of this invention. Also, water-based polyurethanes such as those prepared in accordance with U.S. Pat. No. 4,147,679 can be used as the resinous binder in the base coat. Further, waterbased coatings such as those described in U.S. Pat. No. 5,071,904 can be used as the base coat.

The base coat also contains pigments to give it color. Compositions containing metallic flake pigmentation are useful for the production of so-called "glamour metallic" finishes chiefly upon the surface of automobile bodies. Suitable metallic pigments include in particular aluminum flake, copper bronze flake and metal oxide coated mica.

Besides the metallic pigments, the base coating compositions of the present invention may contain non-metallic color pigments conventionally used in surface coatings including inorganic pigments such as titanium dioxide, iron oxide, chromium oxide, lead chromate, and carbon black, and organic pigments such as phthalocyanine blue and phthalocyanine green. In general, the pigment is incorporated into the coating composition in amounts of about 1 to 80 percent by weight based on weight of coating solids. The metallic pigment is employed in amounts of about 0.5 to 25 percent by weight based on weight of coating solids.

If desired, the base coat composition may contain additional materials well known in the art of formulated surface coatings. These would include surfactants, flow control agents, thixotropic agents, fillers, anti-gassing agents, organic cosolvents, catalysts, and other customary auxiliaries. These materials can constitute up to 40 percent by weight of the total weight of the coating composition.

The base coating compositions can be applied to various substrates to which they adhere. The compositions can be applied by conventional means including brushing, dipping, flow coating, spraying and the like, but they are most often applied by spraying. The usual spray techniques and equipment for air spraying and electrostatic spraying and either manual or automatic methods can be used.

The coating compositions of the present invention may be applied to various substrates including wood, metals, glass, cloth, plastic, including elastomeric substrates, foam, and the like. They are particularly useful in applications over metal substrates found on motor vehicles.

During application of the base coat composition to the substrate, a film of the base coat is formed on the substrate. Typically, the base coat thickness will be about 0.01 to 5, preferably 0.1 to 2 mils in thickness.

After application of the base coat to the substrate, a film is formed on the surface of the substrate by driving solvent, i.e., organic solvent or water, out of the base coat film by heating or by an air drying period. Preferably, the heating will only be for a short period of time, sufficient to ensure that the clear coat can be applied to the base coat without the former dissolving the base coat composition. Suitable drying conditions will depend on the particular base coat composition, and on the ambient humidity with certain waterbased compositions, but in general a drying time of from about 1 to 5 minutes at a temperature of about 80°–250° F. (20°–121° C.) will be adequate to ensure that mixing of the two coats is minimized. At the same time, the base coat film is adequately wetted by the clear coat composition so that satisfactory intercoat adhesion is obtained. Also, more than one base coat and multiple clear coats may be applied to develop the optimum appearance. Usually between coats, the previously applied coat is flashed; that is, exposed to ambient conditions for about 1 to 20 minutes.

The clear topcoat composition may be applied to the base coated substrate by any conventional coating technique such as brushing, spraying, dipping or flowing, but spray applications are preferred because of superior gloss. Any of the known spraying techniques may be employed such as compressed air spraying, electrostatic spraying and either manual or automatic methods.

After application of the clear coat composition to the base coat, the coated substrate is heated to cure the coating layers. In the curing operation, solvents are driven off and the film-forming materials of the clear coat and the base coat are each crosslinked. The heating or curing operation is usually carried out at a temperature in the range of from 160°–350° F. (71°–177° C.), preferably 230°–285° F. (110°–140° C.) but if needed, lower or higher temperatures may be used as necessary to activate crosslinking mechanisms. The thickness of the clear coat is usually from about 0.5–5, preferably 1.2–3 mils.

The invention will be further described by reference to the following examples. Unless otherwise indicated, all parts are by weight.

The following examples (A to O) show the preparation of various free radical initiated N-alkoxymethyl (meth)acrylamide addition polymers. Example P shows the preparation of a free radical initiated addition polymer having hydroxyl functionality.

EXAMPLE A (COMPARATIVE)

A 30% NBMA (N-(n-butoxymethyl)acrylamide) functional acrylic polymer was prepared as follows:

|  | Weight in grams |
|---|---|
| Charge I |  |
| Ektapro EEP[1] | 209.6 |
| Xylene | 52.4 |
| Charge II |  |
| NBMA (55% in 8% xylene and 37% butanol) | 427.4 |
| Butyl acrylate | 157.9 |
| Butyl methacrylate | 236.8 |
| Styrene | 78.9 |
| alpha-methyl styrene dimer | 78.9 |
| Charge III |  |
| Ektapro EEP | 68.5 |
| Lupersol 555 M 60[2] | 109.1 |
| Charge IV |  |
| Ektapro EEP | 5.6 |
| Lupersol 555 M 60 | 9.6 |

[1]ethoxy 3-ethyl propionate, available from Eastman Chemical Co.
[2]t-amyl peracetate, available from E. I. Du Pont de Nemours and Co.

Charge I was added to a suitable reactor and heated to reflux. At reflux, charges II and III were added over 2 hours. Upon the completion of these charges, Charge IV was added over 15 minutes. The reaction contents were held at reflux for 30 minutes. The product was then cooled to room temperature. The finished product had theoretical solids of 60%, and a weight average molecular weight of 3905.

EXAMPLE B

A 40% NBMA functional acrylic polymer was prepared in the same way as the polymer in Example A, except that 10% butyl methacrylate was replaced by NBMA; i.e., an amount of butyl methacrylate equaling 10% of the total monomer content was replaced by NBMA. The finished product had a weight average molecular weight of 4415.

EXAMPLE C

A 45% NBMA functional acrylic polymer was prepared in the same way as the polymer in Example A, except that 15% butyl methacrylate was replaced by NBMA. The finished product had a weight average molecular weight of 5122.

EXAMPLE D

A 50% NBMA functional acrylic polymer was prepared in the same way as the polymer in Example A, except that 20% butyl methacrylate was replaced by NBMA. The finished product had a weight average molecular weight of 5621.

EXAMPLE E

A 60% NBMA functional acrylic polymer was prepared in the same way as the polymer in Example A, except that 20% butyl methacrylate and 10% butyl acrylate were replaced by NBMA. The finished product had a weight average molecular weight of 3648.

EXAMPLE F

A 70% NBMA functional acrylic polymer was prepared in the same way as the polymer in Example A, except that 10% butyl acrylate, 10% styrene and 20% butyl methacrylate were replaced with NBMA. The finished product had a weight average molecular weight of 5465.

EXAMPLE G

An 80% NBMA functional acrylic polymer was prepared in the same way as the polymer in Example A, except that all the butyl acrylate and butyl methacrylate were replaced by NBMA. The finished product had a weight average molecular weight of 4599.

EXAMPLE H (COMPARATIVE)

A 90% NBMA functional acrylic polymer was prepared in the same way as the polymer in Example A, except that all the butyl methacrylate, butyl acrylate, and styrene were replaced by NBMA. The finished product had a weight average molecular weight of 4421.

EXAMPLE I

A 50% NBMA and 1% acrylic acid functional polymer was prepared in the same way as the polymer in Example D, except that 1% butyl acrylate was replaced by acrylic acid. The product had a weight average molecular weight of 6,443.

EXAMPLE J

A 50% NBMA and 2% acrylic acid functional polymer was prepared in the same way as the polymer in Example D, except that 2% butyl acrylate was replaced by acrylic acid. The product had a weight average molecular weight of 6,795.

EXAMPLE K

A 50% NBMA and 5% acrylic acid functional was prepared in the same way as the polymer in Example D, except that 5% butyl acrylate was replaced by acrylic acid. The product had a weight average molecular weight of 8,261.

EXAMPLE L

A 50% NBMA functional polymer was prepared in the same way as the polymer in Example D, except that butyl acrylate was replaced by butyl methacrylate. The product had a weight average molecular weight of 5,149.

EXAMPLE M

A low molecular weight 50% NBMA functional polymer was prepared by synthesizing the polymer at 40% solids (instead of at 60% solids as in other examples) and then stripping the solvents under reduced pressure, as follows:

| | Weight in grams |
|---|---|
| Charge I | |
| SOLVESSO 100[1] | 960.9 |
| Charge II | |
| Styrene | 66.1 |
| Butyl methacrylate | 198.2 |
| NBMA | 347.9 |
| alpha-methyl styrene dimer | 66.0 |
| Charge III | |
| SOLVESSO 100 | 57.3 |
| Lupersol 555 M60 | 91.4 |
| Charge IV | |
| SOLVESSO 100 | 4.7 |
| Lupersol 555 M60 | 7.7 |

[1]SOLVESSO 100 is a mixture of high boiling hydrocarbon solvents and is available from Union Carbide.

Charge I was added to a suitable reactor and heated to reflux. At reflux, charges II and III were added over 2 hours. Upon completion of these charges, charge IV was added over 15 minutes followed by cooling to room temperature. The solids were increased to about 72% by distilling the solvents under reduced pressure. The product had a weight average molecular weight of 2,299.

EXAMPLE N

A polymer containing 25% NBMA and 25% NEMA (N-(n-ethoxymethyl) acrylamide, 91% active, available from American Cyanamid Co.) was prepared in the same way as the polymer in Example L, except that half of the NBMA (based on solids) was replaced with NEMA. The product had a weight average molecular weight of 2,818, and a solids content of 63.88%.

EXAMPLE O

A 50% NBMA functional waterborne polymer was prepared as follows:

| | Weight in grams |
|---|---|
| Charge I | |
| Deionized water | 407.4 |
| ALIPAL CO 436[1] | 4.34 |
| Sodium bicarbonate | 0.52 |
| Charge II | |
| NBMA (95% active in butanol) | 177.7 |
| Styrene | 50.7 |
| Butyl acrylate | 67.5 |
| Butyl methacrylate | 50.7 |
| Tridecyl mercaptan | 5.07 |
| ALIPAL CO 436 | 4.86 |
| Deionized water | 198.50 |
| Charge III | |
| Deionized water | 32.02 |
| Ammonium persulfate | 0.73 |

[1]ALIPAL CO 436 is an anionic surfactant and is available from Rhone-Poulenc Co.

Charge I was added to a suitable reactor and heated to 80° C. At this temperature, 13 grams of charge II was added. Five minutes later Charge III was added and the mixture was held for 20 minutes. The remainder of Charge II was then added over 3 hours, and the mixture was held for 2 hours before cooling. The product had a theoretical solids content of 35%, a pH of 6.22, and a weight average molecular weight of 27,211.

EXAMPLE P (CONTROL)

A 40% HEA (hydroxyethyl acrylate) functional acrylic polymer was prepared in the same way as the polymer in Example B, except that the NBMA was replaced by HEA.

The following examples (1–15) show the preparation of various clear film-forming compositions containing the N-alkoxymethyl (meth)acrylamide addition polymers of Examples A–N. Examples 16 and 17 are included as controls for comparative purposes. The clear film-forming compositions were evaluated as clear coats in color-plus-clear composite coatings for appearance, mar resistance, and resistance to acid etch.

EXAMPLE 1 (COMPARATIVE)

A clear film-forming composition was prepared by mixing together at low shear the following ingredients in the order indicated:

| Ingredients | Solid weight in grams | Solution weight in grams |
|---|---|---|
| NBMA containing polymer of Example A | 100.0 | 174.4 |
| TINUVIN 328[1] | 3.0 | 3.0 |
| Polybutyl acrylate[2] | 0.4 | 0.6 |
| Phenyl acid phosphate | 1.0 | 1.3 |
| ethanol | — | 9.0 |
| methyl n-amyl ketone | — | 3.0 |

[1]Substituted benzotriazole UV stabilizer available from Ciba Geigy Corporation
[2]a flow control agent having a Mw of about 6,700 and a Mn of about 2,600 made in xylene at 62.5% solids

EXAMPLE 2

A clear film-forming composition was prepared as in Example 1 from the following ingredients:

| Ingredients | Solid weight in grams | Solution weight in grams |
|---|---|---|
| NBMA containing polymer of Example B | 100.0 | 166.7 |
| TINUVIN 328 | 3.0 | 3.0 |
| Polybutyl acrylate | 0.4 | 0.6 |
| Phenyl acid phosphate | 1.0 | 1.3 |
| ethanol | — | 9.0 |
| methyl n-amyl ketone | — | 5.0 |

EXAMPLE 3

A clear film-forming composition was prepared as in Example 1 from the following ingredients:

| Ingredients | Solid weight in grams | Solution weight in grams |
|---|---|---|
| NBMA containing polymer of Example C | 100.0 | 166.7 |
| TINUVIN 328 | 3.0 | 3.0 |
| Polybutyl acrylate | 0.4 | 0.6 |
| Phenyl acid phosphate | 1.0 | 1.3 |

EXAMPLE 4

A clear film-forming composition was prepared as in Example 1 from the following ingredients:

| Ingredients | Solid weight in grams | Weight in grams |
|---|---|---|
| NBMA containing polymer of Example D | 100.0 | 166.7 |
| TINUVIN 328 | 3.0 | 3.0 |
| Polybutyl acrylate | 0.4 | 0.6 |
| Phenyl acid phosphate | 1.0 | 1.3 |
| ethanol | — | 9.0 |
| methyl n-amyl ketone | — | 9.2 |

EXAMPLE 5

A clear film-forming composition was prepared as in Example 1 from the following ingredients:

| Ingredients | Solid weight in grams | Solution weight in grams |
|---|---|---|
| NBMA containing polymer of Example E | 100.0 | 167.2 |
| TINUVIN 328 | 3.0 | 3.0 |
| Polybutyl acrylate | 0.4 | 0.6 |
| Phenyl acid phosphate | 1.0 | 1.3 |
| ethanol | — | 9.0 |
| methyl n-amyl ketone | — | 10.0 |

EXAMPLE 6

A clear film-forming composition was prepared as in Example 1 from the following ingredients:

| Ingredients | Solid weight in grams | Solution weight in grams |
|---|---|---|
| NBMA containing polymer of Example F | 100.0 | 163.4 |
| TINUVIN 328 | 3.0 | 3.0 |
| Polybutyl acrylate | 0.4 | 0.6 |
| Phenyl acid phosphate | 1.0 | 1.3 |
| ethanol | — | 9.0 |
| methyl n-amyl ketone | — | 31.5 |

EXAMPLE 7

A clear film-forming composition was prepared as in Example 1 from the following ingredients:

| Ingredients | Solid weight in grams | Solution weight in grams |
|---|---|---|
| NBMA containing polymer of Example G | 100.0 | 165.1 |
| TINUVIN 328 | 3.0 | 3.0 |
| Polybutyl acrylate | 0.4 | 0.6 |
| Phenyl acid phosphate | 1.0 | 1.3 |
| ethanol | — | 9.0 |
| methyl n-amyl ketone | — | 29.8 |

EXAMPLE 8 (COMPARATIVE)

A clear film-forming composition was prepared as in Example 1 from the following ingredients:

| Ingredients | Solid weight in grams | Solution weight in grams |
|---|---|---|
| NBMA containing polymer of Example H | 100.0 | 167.1 |
| TINUVIN 328 | 3.0 | 3.0 |
| Polybutyl acrylate | 0.4 | 0.6 |
| Phenyl acid phosphate | 1.0 | 1.3 |
| ethanol | — | 9.0 |
| methyl n-amyl ketone | — | 37.0 |

EXAMPLE 9

A clear film-forming composition was prepared as in Example 1 from the following ingredients:

| Ingredients | Solid weight in grams | Solution weight in grams |
|---|---|---|
| NBMA containing polymer of Example D | 100.0 | 166.7 |
| TINUVIN 328 | 3.0 | 3.0 |
| Polybutyl acrylate | 0.4 | 0.6 |
| Phenyl acid phosphate | 1.0 | 1.3 |
| Ektapro EEP | — | 11.6 |
| Xylene | — | 9.0 |

EXAMPLE 10

A clear film-forming composition was prepared as in Example 1 from the following ingredients:

| Ingredients | Solid weight in grams | Solution weight in grams |
|---|---|---|
| NBMA and acrylic acid containing polymer of Example I | 100.0 | 166.7 |
| TINUVIN 328 | 3.0 | 3.0 |
| Polybutyl acrylate | 0.4 | 0.6 |
| Phenyl acid phosphate | 1.0 | 1.3 |
| Ektapro EEP | — | 11.6 |
| Xylene | — | 15.0 |

EXAMPLE 11

A clear film-forming composition was prepared as in Example 1 from the following ingredients:

| Ingredients | Solid weight in grams | Solution weight in grams |
|---|---|---|
| NBMA and acrylic acid containing polymer of Example J | 100.0 | 166.7 |
| TINUVIN 328 | 3.0 | 3.0 |
| Polybutyl acrylate | 0.4 | 0.6 |
| Phenyl acid phosphate | 1.0 | 1.3 |
| Ektapro EEP | — | 11.6 |
| Xylene | — | 17.5 |

EXAMPLE 12

A clear film-forming composition was prepared as in Example 1 from the following ingredients:

| Ingredients | Solid weight in grams | Solution weight in grams |
|---|---|---|
| NBMA and acrylic acid containing polymer of Example K | 100.0 | 166.7 |
| TINUVIN 328 | 3.0 | 3.0 |
| Polybutyl acrylate | 0.4 | 0.6 |
| Phenyl acid phosphate | 1.0 | 1.3 |
| Ektapro EEP | — | 11.6 |
| Xylene | — | 35.5 |

EXAMPLE 13

A clear film-forming composition was prepared as in Example 1 from the following ingredients:

| Ingredient | Solid weight in grams | Solution weight in grams |
|---|---|---|
| NBMA and butyl methacrylate containing polymer of Example L | 100.0 | 177.9 |
| TINUVIN 328 | 3.0 | 3.0 |
| Polybutyl acrylate | 0.4 | 0.6 |
| Phenyl acid phosphate | 1.0 | 1.3 |
| ethanol | — | 7.5 |
| methyl n-amyl ketone | — | 26.5 |

EXAMPLE 14

A clear film-forming composition was prepared as in Example 1 from the following ingredients:

| Ingredient | Solid weight in grams | weight in grams |
|---|---|---|
| low molecular weight NBMA containing polymer of Example M | 100.0 | 138.3 |
| TINUVIN 328 | 3.0 | 3.0 |
| Polybutyl acrylate | 0.4 | 0.6 |
| Phenyl acid phosphate | 1.0 | 1.3 |
| ethanol | — | 7.5 |
| methyl n-amyl ketone | — | 30.2 |

EXAMPLE 15

A clear film-forming composition was prepared as in Example 1 from the following ingredients:

| Ingredient | Solid weight in grams | Solution weight in grams |
|---|---|---|
| NBMA/NEMA containing polymer of Example N | 100.0 | 168.7 |
| TINUVIN 328 | 3.0 | 3.0 |
| Polybutyl acrylate | 0.4 | 0.6 |
| Phenyl acid phosphate | 1.0 | 1.3 |
| ethanol | — | 7.5 |
| methyl n-amyl ketone | — | 31.7 |

EXAMPLE 16 (CONTROL)

A clear film-forming composition was prepared as in Example 1 from the following ingredients:

| Ingredient | Solid weight in grams | Solution weight in grams |
|---|---|---|
| ethanol | — | 10.0 |
| TINUVIN 328 | 3.0 | 3.0 |
| Polybutyl acrylate | 0.4 | 0.7 |
| HEA containing polymer of Example P | 60.6 | 97.7 |
| MR-225[1] | 35.0 | 53.8 |
| AEROSIL R812 dispersion[2] | 5.4 | 12.6 |
| Phenyl acid phosphate | 1.5 | 2.0 |
| TINUVIN 123[3] | 0.2 | 0.2 |

[1]Butylated melamine-formaldehyde resin prepared by reacting together 6.0 moles formaldehyde, 6.5 moles n-butanol, and 1.0 mole melamine. The resulting resin is 64.5% solids in a solvent mixture of 15% n-butanol and 85% xylene. Available from Monsanto Chemical Co.
[2]8 parts by weight (pbw) of a highly dispersed hydrophobic amorphous silicon dioxide available from Degussa Corporation; 50 pbw of a solution of hydroxyl functional acrylic polymer having a peak molecular weight of 8000, Mw of 9000, Mn of 3500 (determined by gel permeation chromatography using a polystyrene standard) made from 40% hydroxypropyl acrylate, 20% styrene, 19% butyl acrylate, 18.5% butyl methacrylate, 0.5% methyl methacrylate, 2% acrylic acid at 70% solids in isobutanol, xylene, and SOLVESSO 100; 48.75 pbw xylene; 1.5 pbw isobutanol; 6.75 pbw SOLVESSO 100.
[3]Sterically hindered tertiary amine light stabilizer available from Ciba-Geigy Corp.

EXAMPLE 17 (CONTROL)

A clear film-forming composition was prepared as in Example 1 from the following ingredients:

| Ingredient | Solid weight in grams | Solution weight in grams |
|---|---|---|
| ethanol | — | 10.0 |
| TINUVIN 328 | 3.0 | 3.0 |
| Polybutyl acrylate | 0.4 | 0.7 |
| HEA containing polymer of Example P | 100.0 | 161.2 |
| TINUVIN 123 | 0.2 | 0.2 |

The clear film-forming compositions of Examples 1–17 were applied to a pigmented base coat to form color-plus-clear composite coatings over electrocoated steel substrates. The electrocoat used on the steel is commercially available from PPG Industries, Inc. and is identified as ED-5000. The pigmented base coat is commercially available from PPG Industries, Inc. and is identified as R732N401. The base coat was pigmented black in color.

The base coat was spray applied in two coats to electrocoated steel panels at a temperature of about 75° F. (24° C.). A ten second flash time was allowed between the two base coat applications. After the second base coat application, a flash time of approximately five minutes was allowed at 75° F. (24° C.) before the application of the clear coating composition. The clear film-forming compositions of Examples 1–17 were each applied to a base coated panel in two coats with a ninety second flash at 75° F. (24° C.) allowed between coats. The composite coating was allowed to air flash at 75° F. (24° C.) for five minutes before baking at 285° F. (141° C.) for 25 minutes to cure both the base coat and the clear coat. The panels were baked in a horizontal position. The properties of the composite coatings are reported in Tables I to III below.

TABLE I

| Example | Percent NBMA | Original 20° gloss[1] | 20° gloss after mar[2] | Percent weight solids[3] | Acid etch[4] |
|---|---|---|---|---|---|
| 1 (comparative) | 30 | 87.8 | 18.9 | 50.9 | 2 |
| 2 | 40 | 90.4 | 53.6 | 48.3 | 2 |
| 3 | 45 | 90.8 | 75.1 | 47.6 | 2 |
| 4 | 50 | 91.5 | 75.0 | 45.4 | 3 |
| 5 | 60 | 93.0 | 82.1 | 48.1 | 4 |
| 6 | 70 | 94.3 | 83.3 | 44.1 | 4 |
| 7 | 80 | 96.3 | 86.9 | 44.7 | 5 |
| 8 (comparative) | 90 | 91.5 | 83.8 | 43.5 | 7 |
| 16 (control) | 0 | 87.0 | 84.0 | 51.4 | 8 |
| 17 (control) | 0 | note[5] | — | — | — |

[1]Measured with a 20° BYK Gardner Glossgard II glossmeter, available from Gardner Instrument Co.
[2]Coated panels are marred by applying a dry abrasive powder cleanser (Bon Ami ™ cleanser, Faultless Starch/Bon Ami Co.) followed by ten double rubs to the surface with a wool felt cloth using a Crockmeter mar tester(available from Atlas Electric Devices Company). 20° gloss is read on marred area of panel after being washed with water and patted dry.
[3]Determined by weight loss after 1 hour at 230° F. (110° C.).
[4]Panels were sprayed with a sulfurous acid solution (350 grams deionized water, 12 grams sulfurous acid to give a pH of 2.0 plus or minus 0.1) using a polyethylene spray bottle, giving a distribution of drop sizes up to one quarter inch. Approximately 2.5 to 3.0 grams of solution were applied per 4 × 3 inch panel. The panels were then placed in an oven at 120° F. for twenty minutes. The panels were then removed from the oven and the spray/bake procedure was repeated two more times to give a total of 60 minutes at 120° F. After the third cycle the panels were washed with soap and water and dried, then rated for degree of acid etch resistance on a scale of 0–10 (0 = no observable etching; 10 = severe etching)
[5]Properties not tested; coating did not cure.

The results reported in Table I indicate that mar resistance improves with increasing NBMA levels, although solids and acid etch resistance decrease, and that film-forming compositions containing polymers with about 40% to about 50% NBMA provide the optimum combination of properties. Control Example 16, although exhibiting excellent mar resistance, showed poor acid etch resistance. Control Example 17 did not cure.

TABLE II

| Example | Percent acrylic acid | Original 20° gloss | 20° gloss after mar | Percent weight solids | Acid etch |
|---|---|---|---|---|---|
| 9 | 0 | 92.0 | 75.1 | 44.3 | 3 |
| 10 | 1 | 92.0 | 80.1 | 43.4 | 3 |
| 11 | 2 | 91.7 | 80.4 | 43.2 | 3 |

TABLE II-continued

| Example | Percent acrylic acid | Original 20° gloss | 20° gloss after mar | Percent weight solids | Acid etch |
|---|---|---|---|---|---|
| 12 | 5 | 91.5 | 83.5 | 40.9 | 5 |

The results reported in Table II indicate that mar resistance improves with increasing acrylic acid levels, although solids decrease.

TABLE III

| Example | NBMA level | NEMA level | Original 20° gloss | 20° gloss after mar | Percent weight solids | Acid etch |
|---|---|---|---|---|---|---|
| 13 | 50 | 0 | 88.1 | 70.7 | 44.7 | 1 |
| 14 | 50 | 0 | 89.1 | 45.1 | 49.7 | 2 |
| 15 | 25 | 25 | 88.2 | 74.7 | 45.4 | 3 |
| 16 (control) | 0 | 0 | 87.0 | 84.0 | 51.4 | 8 |
| 17 (control) | 0 | note[1] | — | — | — | — |

[1]Properties not tested; coating did not cure.

The results reported in Table III for Examples 13 and 14 indicate that decreasing the molecular weight of the 50% NBMA functional polymer decreases the mar resistance and acid etch resistance but increases the solids content. The results reported for Examples 13 and 15 indicate that replacing half of the NBMA with NEMA increases the mar resistance and only slightly decreases the acid etch resistance. NBMA/NEMA containing systems are superior to hydroxyl-aminoplast cured systems for acid etch resistance.

EXAMPLE 18

An aqueous-based, clear film-forming composition was prepared from the following mixture of ingredients:

| Ingredient | Solid weight in grams | Solution weight in grams |
|---|---|---|
| waterborne NBMA containing acrylic of Example O | 200.0 | 571.4 |
| Dodecylbenzene sulfonic acid | 2.0 | 2.0 |

The above ingredients were mixed together and a film 2 mils (50.8 microns) thick was drawn on a glass panel with a "Straddle" wet film applicator No. 14 (available from P. G. & T. Co.) The panel was placed in an oven at 140° C. for 30 minutes. The properties are reported in Table IV below.

TABLE IV

| Example | NMBA level | Original 20° gloss | 20° gloss after mar | Percent weight solids | Acid etch |
|---|---|---|---|---|---|
| 17 | 50 | 70 | 50 | 34.9 | 5 |

We claim:
1. A method for applying a composite coating to a substrate which comprises applying to the substrate a colored film-forming composition to form a base coat and applying to said base coat a clear film-forming composition to form a transparent top coat over the base coat character- ized in that the clear film-forming composition is self-crosslinkable and comprises as the main resinous component a non-gelled addition polymer which is the free radical initiated reaction product of the following polymerizable ethylenically unsaturated monomers:

a) about 40 to 80% by weight of an N-alkoxymethyl-(meth)acrylamide;

b) about 20 to 60% total by weight of at least one polymerizable ethylenically unsaturated monomer selected from the group consisting of styrene, methyl (meth)acrylate, butyl (meth)acrylate, cyclohexyl (meth)acrylate, and mixtures thereof;

c) up to 10% by weight, based on total weight of the polymerizable ethylenically unsaturated monomers used in preparing the polymer, of a hydroxyl functional ethylenically unsaturated monomer selected from the group consisting of hydroxypropyl (meth)acrylate, hydroxyethyl (meth)acrylate, and hydroxybutyl (meth)acrylate, and d) up to 5% by weight, of an acid functional ethylenically unsaturated monomer, and where the percentage by weight is based on total weight of the polymerizable ethylenically unsaturated monomers used in preparing the polymer.

2. The method of claim 1, wherein the N-alkoxymethyl-(meth)acrylamide is N-butoxymethyl(meth)acrylamide.

3. The method of claim 1, wherein the N-alkoxymethyl-(meth)acrylamide is present at about 40 to 50% by weight.

4. The method of claim 1, wherein the weight average molecular weight of the polymer is about 1800 to 80,000.

5. The method of claim 4, wherein the weight average molecular weight of the polymer is about 2000 to 8500.

6. The method of claim 5, wherein the weight average molecular weight of the polymer is less than about 3000 and the polymer is synthesized in high boiling solvents that reflux of around 110° to 160° C. at a solids content of about 30 to 40 weight percent by weight.

7. The method of claim 1, wherein the clear film-forming composition further comprises about 0.5 to 1.5% by weight, based on total weight of resin solids, of an acid functional catalyst selected from the group consisting of phenyl acid phosphate, sulfonic acid, or a substituted sulfonic acid such as paratoluene sulfonic acid and dodecyl benzene sulfonic acid.

8. The method of claim 3, wherein the clear film-forming composition is aqueous based.

9. The method of claim 8, wherein the N-alkoxymethyl-(meth)acrylamide is N-butoxymethyl(meth)acrylamide.

10. The method of claim 8, wherein the weight average molecular weight of the polymer is about 25,000 to 70,000.

11. The method of claim 8, wherein the clear film-forming composition further comprises about 0.5 to 1.5% by weight, based on total weight of resin solids, of an acid functional catalyst.

12. The method of claim 1, wherein the polymer further includes up to 15% by weight, based on total weight of the polymerizable ethylenically unsaturated monomers used in preparing the polymer, of an epoxy functional ethylenically unsaturated monomer.

* * * * *